United States Patent
Katano

(10) Patent No.: US 7,943,265 B2
(45) Date of Patent: May 17, 2011

(54) FUEL CELL SYSTEM

(75) Inventor: Koji Katano, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 953 days.

(21) Appl. No.: 11/579,541

(22) PCT Filed: May 12, 2005

(86) PCT No.: PCT/IB2005/001300
§ 371 (c)(1),
(2), (4) Date: Nov. 3, 2006

(87) PCT Pub. No.: WO2005/112159
PCT Pub. Date: Nov. 24, 2005

(65) Prior Publication Data
US 2007/0243437 A1    Oct. 18, 2007

(30) Foreign Application Priority Data

May 14, 2004   (JP) ................................ 2004-144637

(51) Int. Cl.
*H01M 8/04* (2006.01)
(52) U.S. Cl. ........ 429/443; 429/429; 429/428; 429/433; 429/448; 429/449
(58) Field of Classification Search .................... 429/13, 429/17, 22, 25, 39, 427, 428, 443, 448, 449
See application file for complete search history.

(56) References Cited

U.S. PATENT DOCUMENTS

| | | | |
|---|---|---|---|
| 2002/0094469 A1 | 7/2002 | Yoshizumi et al. | |
| 2003/0157383 A1* | 8/2003 | Takahashi | 429/22 |

FOREIGN PATENT DOCUMENTS

| | | |
|---|---|---|
| EP | 1 339 125 A2 | 8/2003 |
| JP | A-02-087479 | 3/1990 |
| JP | A-2002-289237 | 10/2002 |
| JP | A-2003-168467 | 6/2003 |
| JP | A-2003-173807 | 6/2003 |
| JP | A-2003-317752 | 11/2003 |
| WO | WO 00/24074 A1 | 4/2000 |
| WO | WO 2004/049489 A2 | 6/2004 |
| WO | WO 2005/031901 A2 | 4/2005 |

* cited by examiner

*Primary Examiner* — Patrick Ryan
*Assistant Examiner* — Ben Lewis
(74) *Attorney, Agent, or Firm* — Oliff & Berridge, PLC

(57) ABSTRACT

A fuel cell system (50) includes pressure obtaining means (4) for obtaining the pressure in a hydrogen system (anode (1*b*)) of a fuel cell (1), pressure estimation means (10) for estimating the hydrogen partial pressure in the hydrogen system. Further, the fuel cell system (50) includes impurity concentration estimation means (10) for estimating the impurity concentration in the hydrogen system. That is, the impurity concentration estimation means (10) estimates the impurity concentration taking the present state of the hydrogen system into consideration. Thus, the impurity concentration estimation means (10) accurately estimates the impurity concentration in the hydrogen system of the fuel cell (1).

17 Claims, 3 Drawing Sheets

FUEL CELL SYSTEM

BACKGROUND OF THE INVENTION

1. Field of the Invention

The invention relates to a fuel cell system for controlling the gas supply/discharge by estimating the impurity concentration in a fuel cell.

2. Description of the Related Art

Fuel cell systems applicable to fuel cell automobiles or the like are known. The fuel cell system includes a fuel cell stack as a main component, and the fuel cell stack has an anode and a cathode. Hydrogen is supplied as a fuel gas to the anode, and the air is supplied to the cathode. Further, the fuel cell system includes components such as a tank for storing the fuel gas, e.g., the hydrogen to be supplied to the anode, and a pump for circulating the exhaust gas containing the unconsumed fuel gas back to the anode. In the fuel cell stack, the hydrogen reacts with oxygen in the air to generate electricity.

It is known that as the progress of reaction in the fuel cell, nitrogen in the cathode gas (air) and water produced in the reaction move from the cathode toward the anode through an electrolyte membrane. Therefore, the partial pressure of the nitrogen or water vapor (hereinafter also collectively referred to as the "impurities") increases, and the concentration of the fuel gas (hydrogen) decreases. As a result, the power generation performance of the fuel cell is lowered undesirably.

In an attempt to address the problem, generally, a discharge valve provided in a discharge passage on the anode side (hereinafter also referred to as a "hydrogen system") is opened to discharge the gas containing the unconsumed hydrogen and the impurities. For example, Japanese Patent Application Laid Open No. 2003-168467 discloses a technique in a fuel cell system in which an air pump of a fuel cell is operated at a target rotational speed, and an air regulator valve is used for pressure adjustment to a target pressure. In the disclosed technique, the atmospheric pressure is estimated based on the rotational speed and the valve position of the pressure regulator valve for correcting the discharge interval of a hydrogen discharge valve. Further, in a technique disclosed in Japanese Patent Application Laid Open No. 2002-289237, if the impurity concentration in a hydrogen system increases, a hydrogen off gas (consumed gas used during generation of electricity) is discharged from the hydrogen system to decrease the impurity concentration.

However, in the art disclosed in Japanese Patent Application Laid Open No. 2003-168467, the discharge interval is controlled only based on the flow rate of the air without taking the gas state in the hydrogen system into consideration. Further, in the art disclosed in Japanese Patent Application Laid Open No. 2002-289237, the impurity concentration is estimated only based on the elapsed time since the start of operation of the fuel cell system or the hydrogen concentration detected by a hydrogen concentration sensor, and the discharging operation in the hydrogen system is performed in accordance with the estimated impurity concentration. Therefore, in the control techniques disclosed in Japanese Patent Application Laid Open No. 2003-168467 and Japanese Patent Application Laid Open No. 2002-289237, since the current state in the hydrogen system is not taken into consideration in estimating the impurity concentration, the unconsumed hydrogen is discharged wastefully. Therefore, for example, fuel economy of the fuel cell is lowered undesirably.

SUMMARY OF THE INVENTION

The invention has been made to solve the problems, and an object of the invention is to provide a fuel cell system which makes it possible to estimate the impurity concentration in a hydrogen system of a fuel cell correctly, and reduce the unnecessary gas discharge in the hydrogen system.

According to an aspect of the invention, a fuel cell system includes pressure obtaining means for obtaining a pressure in a hydrogen system of a fuel cell, pressure estimation means for estimating a hydrogen partial pressure in the hydrogen system, and impurity concentration estimation means for estimating an impurity concentration in the hydrogen system based on the obtained pressure and the estimated pressure wherein the impurity concentration estimation means estimates that the impurity concentration is equal to or higher than a predetermined concentration if the pressure obtained by the pressure obtaining means is equal to or higher than an upper limit hydrogen system pressure value which is an upper limit value of the pressure which allows for stable power generation of the fuel cell.

The fuel cell system is mounted in for example a fuel cell automobile. The fuel cell system includes pressure obtaining means for obtaining the pressure in a hydrogen system (anode) of a fuel cell, and pressure estimation means for estimating the hydrogen partial pressure in the hydrogen system. Further, the fuel cell system includes impurity concentration estimation means for estimating the impurity concentration in the hydrogen system based on the obtained pressure in the hydrogen system and the estimated hydrogen partial pressure. That is, the impurity concentration estimation means estimates the impurity concentration taking the current state of the hydrogen system into consideration. Thus, the impurity concentration estimation means accurately estimates the impurity concentration in the hydrogen system of the fuel cell.

The fuel cell system of the aspect may be configured such that the pressure estimation means estimates that the upper limit hydrogen system pressure value based on at least a target pressure value, an amount of hydrogen present in an anode and a maximum allowable nitrogen amount which is a maximum value of a nitrogen amount at which power generation can be performed stably in an anod The fuel cell system of the aspect may include means for increasing the amount of hydrogen supplied to the hydrogen system if the impurity concentration estimation means estimates that the impurity concentration is equal to higher than the predetermined concentration, and the pressure obtained by the pressure obtaining means is smaller than the predetermined pressure.

According to the aspect, the fuel cell system may increase the amount of hydrogen supplied to the hydrogen system if the impurity concentration estimation means estimates that the impurity concentration is equal to higher than the predetermined concentration, and the pressure obtained by the pressure obtaining means is smaller than the predetermined pressure. The impurity greatly affects the power generation stability of the fuel cell. Therefore, if the impurity concentration is equal to or higher than the predetermined concentration, it is not possible to obtain electricity from the fuel cell stably. However, even if the impurity concentration is equal to or higher than the predetermined concentration, as long as the pressure in the hydrogen system is lower than the predetermined pressure, the increase in the pressure does not adversely affect the fuel cell. Therefore, in such a case, the amount of the hydrogen supplied to the hydrogen system is increased. Thus, stable power generation in the fuel cell system is achieved, and wasteful gas discharge in the hydrogen system is reduced.

The fuel cell system of the aspect may be configured such that the predetermined pressure is a maximum allowable hydrogen system pressure which is a maximum pressure of the hydrogen system which can be tolerated by the fuel cell.

The fuel cell system of the aspect may include means for discharging fluid in the hydrogen system if the impurity concentration estimation means estimates that the impurity concentration is equal to or higher than the predetermined concentration, and the pressure obtained by the pressure obtaining means is equal to or higher than the predetermined pressure.

According to the aspect, the fuel cell system may discharge gas in the hydrogen system if the impurity concentration estimation means estimates that the impurity concentration is equal to or higher than the predetermined concentration, and the obtained pressure in the hydrogen system is equal to or higher than the predetermined pressure. In this case, the impurity concentration is equal to or higher than predetermined concentration, and it is not possible to further increase the pressure in the hydrogen system in view of the durability of the fuel cell or the like. Therefore, fluid in the hydrogen system is discharged. That is, by discharging the gas in the hydrogen system, the impurity is discharged to achieve the power generation stability of the fuel cell, and the further increase of the pressure applied to the fuel cell is prevented.

The fuel cell system of the aspect may include means for discharging fluid in the hydrogen system if the impurity concentration estimation means estimates that the impurity concentration is equal to or higher than the predetermined concentration. According to the aspect, if the impurity concentration is equal to or higher than the predetermined concentration, the amount of the hydrogen to be supplied may not be increased. Instead, the fluid in the hydrogen system may be always discharged to discharge the impurities for achieving stable power generation in the fuel cell.

In the fuel cell system, the predetermined pressure may preferably be determined based on the mechanical strength of the fuel cell. In this case, the predetermined pressure may be determined based on the mechanical strength such as durability of the fuel cell.

Further, in the fuel cell system, the pressure estimation means may preferably estimate the hydrogen partial pressure based on the amount of hydrogen consumed by the fuel cell and the amount of hydrogen permeated through an electrolyte membrane of the fuel cell, and the impurity concentration estimation means may estimate the impurity concentration based on the pressure obtained by the pressure obtaining means, the estimated pressure, and the maximum allowable nitrogen amount of the fuel cell. In this case, the pressure estimation means may estimate the substantial hydrogen pressure in the hydrogen system based on the amount of hydrogen consumed by the fuel cell and the amount of hydrogen permeated through an electrolyte membrane of the fuel cell. Further, the impurity concentration estimation means may estimate the impurity concentration based on the obtained pressure in the hydrogen system, the estimated hydrogen pressure, and the maximum allowable nitrogen amount which allows for stable power generation of the fuel cell. In this manner, the impurity concentration estimation means can further improve the accuracy in estimating the impurity concentration.

The fuel cell system of the aspect may be configured such that the pressure estimation means calculates an amount of hydrogen permeated through an electrolyte membrane of the fuel cell based on the power generation amount and temperature of the fuel cell.

The fuel cell system of the aspect may be configured such that the pressure estimation means calculates the maximum allowable nitrogen amount based on the power generation amount and temperature of the fuel cell.

The fuel cell system of the aspect may be configured such that the impurity concentration estimation means estimates the impurity concentration based on the pressure obtained by the pressure obtaining means, the pressure estimated by the pressure estimation means, an amount of nitrogen in the hydrogen system, and the maximum allowable nitrogen amount of the fuel cell The fuel cell system of the aspect may be configured such that the pressure estimation means estimates the hydrogen partial pressure based on the amount of hydrogen supplied to the fuel cell and the amount of hydrogen consumed by the fuel cell, and the impurity concentration estimation means estimates the impurity concentration based on the pressure obtained by the pressure obtaining means, the pressure estimated by the pressure estimation means, and the maximum allowable nitrogen amount of the fuel cell.

According to another aspect of the invention, a fuel cell system includes pressure obtaining means for obtaining a pressure in a hydrogen system of a fuel cell, pressure estimation means for estimating a hydrogen partial pressure in the hydrogen system, and impurity amount estimation means for estimating an impurity amount in the hydrogen system based on the obtained pressure and the estimated pressure.

DETAILED DESCRIPTION OF THE PREFERRED EMBODIMENTS

Hereinafter, preferred embodiments of the invention will be described with reference to the drawings.

[Structure of Fuel Cell System]

Figure 1:
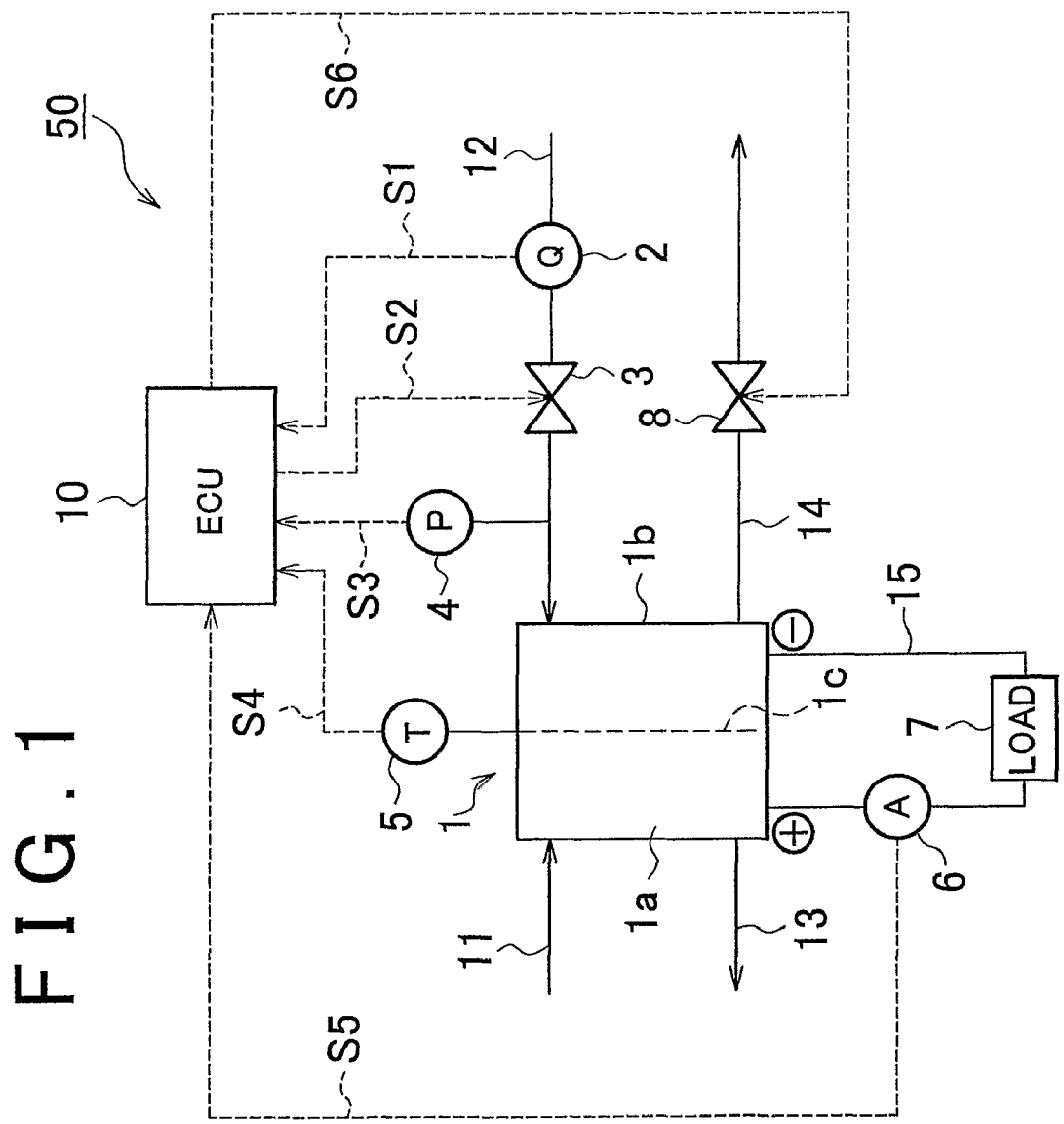
FIG. 1 is a block diagram schematically showing structure of a fuel cell system according to an embodiment of the invention.

FIG. 1 is a block diagram schematically showing structure of a fuel cell system according to an embodiment of the invention.

The fuel cell system 50 includes a flow meter 2, a supply valve 3, a pressure gauge 4, a temperature sensor 5, a current sensor 6, a discharge valve 8, an ECU (Electronic Control Unit) 10, supply passages 11, 12, and discharge passages 13, 14 as main components. The fuel cell system 50 is mounted in for example a fuel cell automobile (hereinafter simply referred to as the "vehicle"), and implements various controls on the fuel cell (fuel cell stack) 1.

The fuel cell 1 is formed by stacking a plurality of unit cells. Each of the unit cells is interposed between electrically conductive separators, and includes an electrolyte membrane 1c, and electrodes on both surfaces of the electrolyte membrane 1c. Each of the electrodes has structure of, e.g., a porous gas diffusion layer. The level of the output voltage collected from fuel cell 1 depends on the number of the unit cells. For ease of understanding, FIG. 1 shows structure of only one unit cell including a cathode (air electrode) 1a and an anode 1b on surfaces of the electrolyte membrane 1c. In FIG. 1, the air is supplied to the cathode 1a from the supply passage 11, and the hydrogen is supplied to the anode 1b from the supply passage 12 for generating electricity.

The fuel cell 1 is used as a power source for supplying electricity to a motor which drives the vehicle, and generates a high DC voltage of about 300V. The voltage generated in the fuel cell 1 is applied to an inverter for supplying electricity to the motor in correspondence with a command torque or the like, various auxiliary devices mounted in the vehicle, and a battery (secondary battery) for supplying electricity to the auxiliary devices (these loads are shown collectively as the "load 7") through a power supply cable 15.

The air flows through the supply passage 11, and the hydrogen flows through the supply passage 12. Further, the gas discharged from the cathode 1a flows through the discharge passage 13, and the gas discharged from the anode 1b flows through the discharge passage 14.

Next, various sensors and valves of the fuel cell system 50 will be described. The flow meter 2, the supply valve 3, and the pressure gauge 4 are provided along the supply passage 12. The flow meter 2 detects the flow rate of the fluid flowing through the supply passage 12. That is, the flow rate detected by the flow meter 2 corresponds to the amount of hydrogen supplied to the anode 1b. The flow meter 2 outputs a signal S1 corresponding to the detected flow rate to the ECU 10.

The supply valve 3 adjusts the flow rate of the hydrogen (amount of the hydrogen) supplied to the anode 1b. The supply valve 3 is controlled by a control signal S2 outputted from the EUC 10. If the valve position of the control valve 3 is adjustable accurately, the flow meter 2 that directly detects the flow rate as described above may not be used. In this case, the flow rate of the hydrogen supplied to the anode 1b is determined based on the valve position of the supply valve 3. Further, if the supply valve 3 is an injector or the like (i.e., if control of opening or closing of the valve is implemented based on the duty ratio of the control pulse of the supplied electrical current), the flow meter 2 may not be used. In this case, the flow rate is determined based on the pressure and the temperature at an upstream position and the signal for opening the valve.

The pressure gauge 4 detects the pressure in the supply passage 12, i.e., the pressure at the anode 1b of the fuel cell 1. That is, the pressure gauge 4 functions as pressure obtaining means for obtaining the pressure in the hydrogen system of the fuel cell 1. The pressure gauge 4 outputs a signal S3 corresponding to the detected pressure to the ECU 10.

Further, the temperature sensor 5 is provided for the fuel cell 1. That is, the temperature sensor 5 detects the temperature of the fuel cell 1. The temperature sensor 5 outputs a signal S4 corresponding to the detected temperature to the ECU 10. The temperature sensor 5 may not be provided directly in the fuel cell 1. For example, alternatively, the temperature of a coolant supplied to the fuel cell 1 may be used as the temperature of the fuel cell 1. That is, it is not necessary to directly detect the temperature of the fuel cell 1. If there is any temperature which accurately reflects the temperature of the fuel cell 1, such temperature may be used alternatively.

The current sensor 6 is provided in the power supply cable 15. The current sensor 6 detects the current value of the electricity generated by the fuel cell 1. The current sensor 6 outputs a signal S5 corresponding to the detected current value to the ECU 10. The output signal S5 from the current sensor 6 corresponds to the amount of electricity generated in the fuel cell 1. Further, the discharge valve 8 is provided in the discharge passage 14. The discharge passage 8 discharges the gas containing the unconsumed hydrogen and impurities (e.g., hydrogen and water) from the anode 1b. The discharge valve 8 is controlled by a control signal S6 outputted from the EUC 10.

The ECU 10 includes unillustrated components such as a CPU, ROM, RAM, an A/D converter, and an I/O interface. As described above, the ECU 10 controls the supply valve 3 and the discharge valve 8 based on the detection signals S1, S3, S4 and S5 outputted from the flow meter 2, the pressure gauge 4, the temperature sensor 5, and the current sensor 6. That is, the ECU 10 supplies control signals S2 and S6 to the supply valve 3 and the discharge valve 8, respectively. In the embodiment of the invention, the ECU 10 estimates the present hydrogen partial pressure in the anode 1b, and estimates the concentration (or the amount) of impurities in the anode 1b accurately based on the estimated hydrogen partial pressure. Then, the ECU 10 controls the supply valve 3 or the discharge valve 8 based on the estimated impurity concentration. That is, the ECU 10 increases the amount of hydrogen supplied to the anode 1b or discharges the gas from the anode 1b based on the estimated impurity concentration. The estimation method and control of the valves will be described later in detail. As described above, the ECU 10 functions as pressure estimation means for estimating the hydrogen partial pressure in the hydrogen system, and impurity concentration estimation means for estimating the impurity concentration.

[Estimation Method of Impurity Concentration]

Hereinafter, the estimation method of impurity concentration and the control method of the supply valve 3 and the discharge valve 8 based on the estimation result will be described specifically the estimation and the control being performed by the ECU 10.

Figure 2:
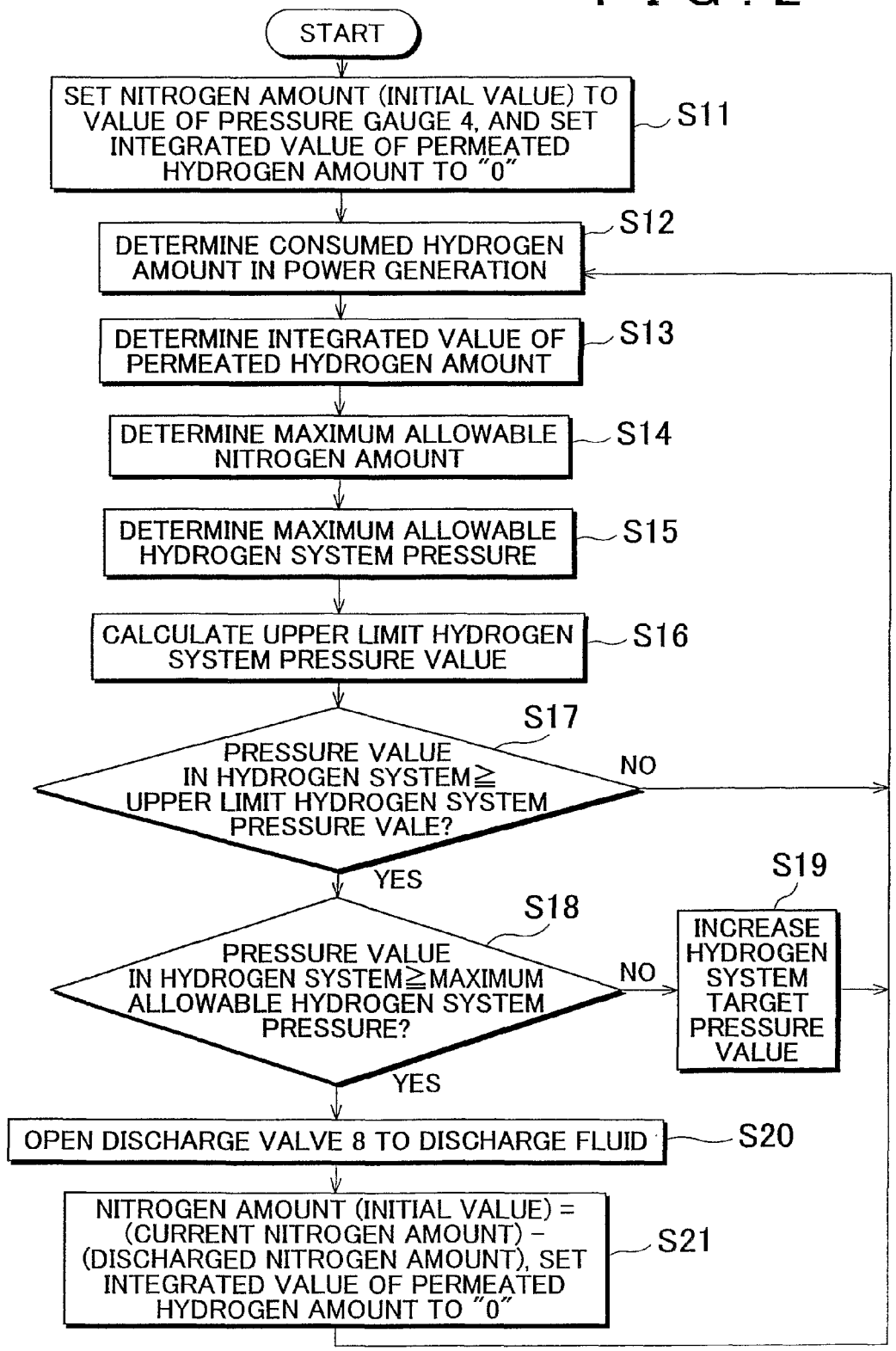
FIG. 2 is a flow chart illustrating the process of estimating the impurity concentration according to the embodiment of the invention.

FIG. 2 is a flow chart showing the process performed by the ECU 10. The process is performed repeatedly at a predetermined frequency during operation of the fuel cell 1. For example, it is preferable that the process be performed at a short frequency of LHz or more.

The overall flow of the process will be described briefly. Firstly, from steps S11 to step S18, the ECU 10 estimates the impurity concentration based on the present state of the fuel cell 1, determines whether the estimated impurity concentration is equal to or higher than a predetermined concentration, and determines whether the pressure in the anode 1b has reached the maximum allowable hydrogen system pressure. From steps S19 to step S21, the ECU 10 controls the supply valve 3 and the discharge valve 8 based on the determination results to reduce the unnecessary gas discharge in the hydrogen system, while maintaining the stable power generation performed by the fuel cell 1. In the process, the "impurity amount" may be estimated instead of the "impurity concentration". Since the volume of the fuel cell 1 is constant, the concentration and the amount are in direct proportion to each other.

In the following description, it is assumed that only nitrogen is considered as the impurity. It is because nitrogen is the most important factor that affects power generation stability of the fuel cell 1. Though the gas at the anode 1b contains other impurities such as water vapor, normally, the amount of the water vapor is almost constant as long as the temperature is constant. Therefore, the amount of the water vapor can be taken out of consideration by setting a predetermined threshold based on the assumption that the temperature is almost constant, or by correcting the threshold based on the temperature.

In step S11, the ECU 10 sets an initial value of the nitrogen amount in the anode 1b (nitrogen amount (initial value)) and an integrated value of the permeated hydrogen amount. Generally, step S11 is performed, e.g., at the time of starting operation of the fuel cell 1. The initial value of the nitrogen amount is set using the pressure value supplied from the pressure gauge 4 (pressure value corresponding to the signal S3). After a certain time has elapsed since operation of the fuel cell 1 is stopped, the nitrogen concentration in the hydrogen system of the fuel cell 1 is almost 100%, and the pressure matches the atmospheric pressure. Further, in the case where the hydrogen concentration is 100% (i.e., the nitrogen concentration is 0%), the output value of the pressure gauge 4 is known. Therefore, based on the relationship between the pressure and the nitrogen amount, the nitrogen amount in the hydrogen system is calculated using the pressure value outputted from the pressure gauge 4. When operation of the fuel cell 1 is stopped, and started again immediately, the nitrogen amount obtained during the last operation may be used as the initial value.

The permeated hydrogen amount is the amount of hydrogen that has permeated through the electrolyte membrane 1c from the anode 1b to the cathode 1a. During operation of the fuel cell 1, the permeated hydrogen amount increases as the time passes. For example, at the time of starting operation of the fuel cell 1, the initial value of the integrated value of the permeated hydrogen amount is set to "0". After the above step, the process proceeds to step S12.

In step S12, the ECU 10 determines the consumed hydrogen amount in power generation, i.e., the amount of hydrogen consumed in power generation of the fuel cell 1 (hereinafter, simply referred to as the "consumed hydrogen amount" where appropriate). The ECU 10 obtains the current value (corresponding to the signal S5) supplied from the current sensor 6, and calculates the consumed hydrogen amount based on the known relationship between the consumed hydrogen amount and the current value (i.e., power generation amount). Then, the process proceeds to step S13.

Figure 3:
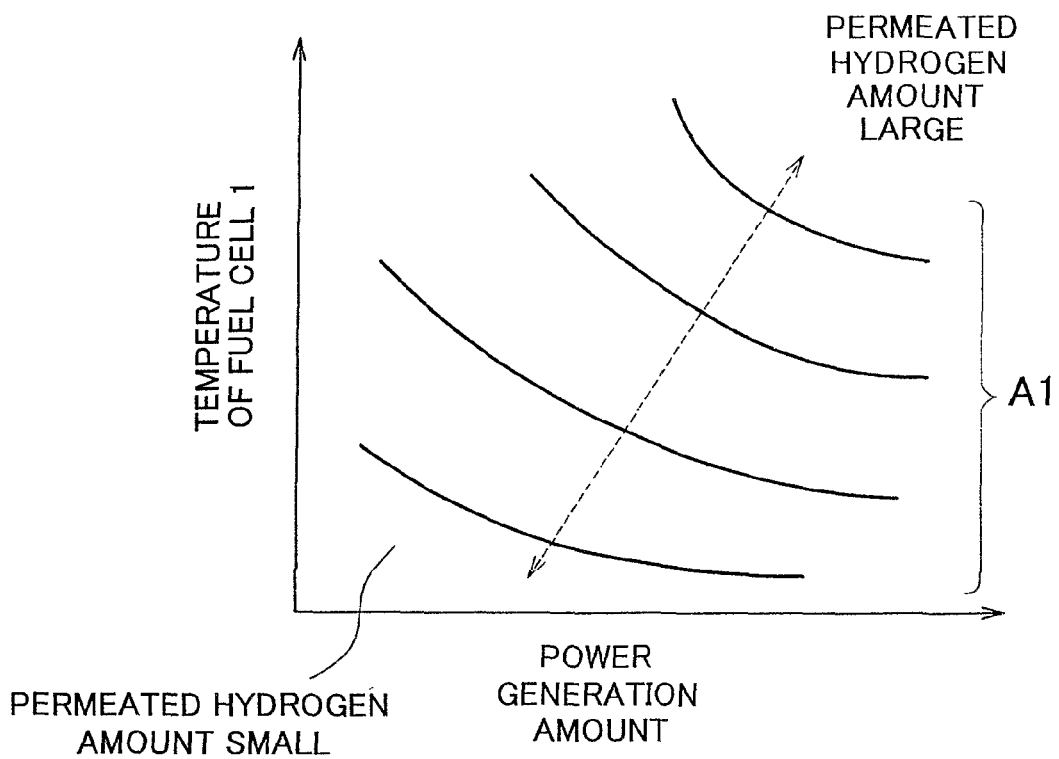
FIG. 3 is a map used for determining the permeated hydrogen amount.

In step S13, the ECU 10 determines the integrated value of the amount of hydrogen that has moved from the anode 1b to the cathode 1a by permeating through the electrolyte membrane 1c (hereinafter referred to as the "permeated hydrogen amount"). A method of calculating the permeated hydrogen amount will be described with reference to FIG. 3. In FIG. 3, the horizontal axis indicates the power generation amount of the fuel cell 1, and the vertical axis indicates the temperature of the fuel cell 1. Further, each of curves A1 is a characteristic curve indicating the relationship among the permeated hydrogen amount, the power generation amount, and the temperature of the fuel cell 1. That is, the permeated hydrogen amount depends on the power generation amount and the temperature of the fuel cell 1. As can be seen from the characteristic curves A1 (hereinafter also referred to as the "map A1"), as the power generation amount increases and as the temperature of the fuel cell 1 increases, the permeated hydrogen amount increases. As described above, in step S13, the ECU 10 obtains the power generation amount of the fuel cell 1 from the current sensor 6, and obtains the temperature of the fuel cell 1 from the temperature sensor 5 to determine the permeated hydrogen amount based on the obtained values and the map A1. The ECU 10 adds the determined permeated hydrogen amount to the last integrated value of the permeated hydrogen amount. After the above step, the process proceeds to step S14. The data of the map A1 is stored in memory in the ECU 10 or the like.

Figure 4:
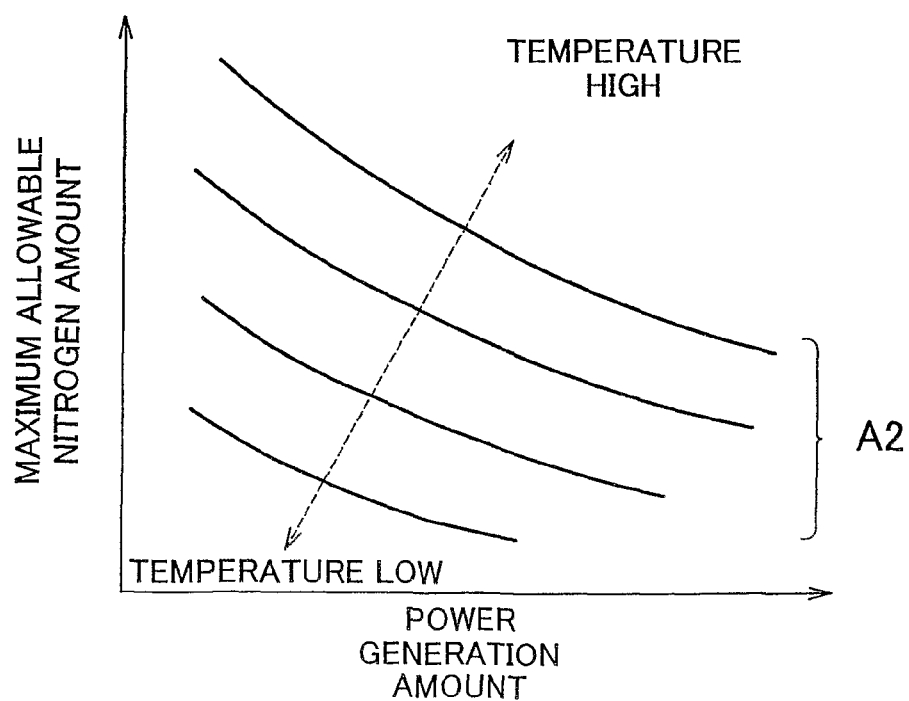
FIG. 4 is a map used for determining the amount of the maximum allowable nitrogen amount.

In step S14, the ECU 10 calculates the maximum allowable nitrogen amount. The maximum allowable nitrogen amount is the maximum value of the nitrogen amount at which power generation can be performed stably in the anode 1b. That is, if the amount of nitrogen in the anode 1b is in excess of the maximum allowable nitrogen amount, power generation of the fuel cell 1 is not stable. A method of calculating the maximum allowable nitrogen amount will be described with reference to FIG. 4. In FIG. 4, the horizontal axis indicates the power generation amount of the fuel cell 1, and the vertical axis indicates the maximum allowable nitrogen amount. Each of curves A2 in FIG. 4 is a characteristic curve indicating the relationship among the power generation amount, the maximum allowable nitrogen amount, and the temperature of the fuel cell 1. That is, the maximum allowable nitrogen amount also depends on the power generation amount and the temperature of the fuel cell 1. As can be seen from the characteristic curves A2 (hereinafter also referred to as the "map A2" where appropriate), as the power generation amount increases, the maximum allowable nitrogen amount tends to decrease. It is because when the power generation amount is large, it is necessary to increase the discharge amount of nitrogen as the impurity. Further, as the temperature of the fuel cell 1 decreases, the maximum allowable nitrogen amount tends to decrease. It is because as the temperature of the fuel cell 1 (the coolant temperature in the fuel cell stack) becomes lower, it is more difficult to perform power generation, and thus, it is necessary to increase the hydrogen concentration. As described above, in step S14, the ECU 10 obtains the power generation amount of the fuel cell 1 from the current sensor 6, obtains the temperature of the fuel cell 1 from the temperature sensor 5, and determines the maximum allowable nitrogen amount based on these obtained values and the map A2. Then, the process proceeds to step S15. The data of the map A2 is also stored in the memory in the ECU 10 or the like.

In step S15, the ECU 10 determines the maximum allowable hydrogen system pressure. The maximum allowable hydrogen system pressure is the maximum pressure of the hydrogen system which can be tolerated by the fuel cell 1. The value of the maximum allowable hydrogen system pressure is determined by the mechanical strength such as durability of the fuel cell 1, and a fixed value may be used as the maximum allowable hydrogen system pressure. The ECU 10 reads the maximum allowable hydrogen system pressure from a memory or the like and uses this value. The read maximum allowable hydrogen system pressure may be corrected in correspondence with the state of the fuel cell system 50. Further, if the maximum allowable hydrogen system pressure is defined based on the pressure difference between the air pressure on the cathode side and the maximum allowable hydrogen system pressure, the maximum allowable hydrogen system pressure may be determined, e.g., based on a predetermined map using the air pressure on the cathode side as a parameter. After the above step is finished, the process proceeds to step S16.

In step S16, the ECU 10 determines the upper limit hydrogen system pressure value using the values determined in steps S12 to S14. The upper limit hydrogen system pressure value is an upper limit value of the pressure in the anode 1 which allows for stable power generation at the present level of the power generation amount. The upper limit hydrogen system pressure value can be determined by the following equation (1).

$$\text{Upper limit hydrogen system pressure value} = \text{target pressure value} + \begin{pmatrix} \text{supplied hydrogen amount} - \\ \text{consumed hydrogen amount} - \\ \text{integrated value of} \\ \text{permeated hydrogen amount} \end{pmatrix} + \begin{pmatrix} \text{maximum allowable nitrogen amount} - \\ \text{initial value of hydrogen amount} \end{pmatrix} \quad \text{equation (1)}$$

the "target pressure value" indicated by the first item of the right-hand side of the equation (1) is a value determined by the power generation amount required of the fuel cell 1. Specifically, the target pressure value is determined based on the required power generation amount supplied to the ECU 10 from the outside.

Further, in the second item of the right-hand side of the equation, the "supplied hydrogen amount" is the amount of hydrogen supplied to the fuel cell 1 (corresponds to the detected value indicated by the detection signal S1 from the flow meter 2), the "consumed hydrogen amount" is the value determined in step S12, and the "integrated value of the permeated hydrogen amount" is the value determined in step S13. That is, in the second item of the right-hand side of the equation (1), the present amount of hydrogen actually which present in the anode 1*b* is determined. The hydrogen amount is converted into the pressure value, and the converted pressure value is used as the hydrogen amount.

Further, the third item of the right-hand side of the equation (1) corresponds to the maximum nitrogen amount which can be tolerated further from the present state of the anode 1*b*. The nitrogen amount is also converted into the pressure value, and the converted pressure value is used as the nitrogen amount. The "maximum allowable nitrogen amount" is the value determined in step S14. The "initial value of the nitrogen amount" is the value set in step S11. After the upper limit hydrogen system pressure value is calculated in this manner, the process proceeds to step S17.

In step S17, the ECU 10 determines whether the pressure value (corresponds to the signal S3) detected by the pressure gauge 4, i.e., the present pressure in the anode 1*b* (hereinafter referred to as the "pressure value in the hydrogen system") is equal to or higher than the upper limit hydrogen system pressure value determined in step S16. The upper limit hydrogen system pressure value indicates the hydrogen system pressure value obtained in a state in which the amount of nitrogen (impurity) present in the anode 1*b* is the maximum in an allowable range. Therefore, comparison between the pressure value in the hydrogen system and the upper limit hydrogen system pressure value is performed to determine whether the impurity concentration in the anode 1*b* is equal to or higher than a predetermined concentration (whether the amount of the impurity is equal to or higher than a predetermined amount).

If the pressure value in the hydrogen system is smaller than the upper limit hydrogen system pressure value (NO in step S17), the process performed by the ECU 10 goes back to step S12. Since the impurity concentration in the anode 1*b* is smaller than the predetermined concentration, therefore, additional hydrogen is supplied to the anode 1*b* without opening the discharge valve 8 to discharge the impurities.

If the pressure value in the hydrogen system is equal to or higher than the upper limit hydrogen system pressure value (YES in step S17), the process proceeds to step S18. In step S18, the ECU 10 determines whether the pressure value in the hydrogen system is equal to or higher than the maximum allowable hydrogen system pressure determined in step S15. That is, in step S18, the ECU 10 determines whether the present pressure in the hydrogen system applies the excessive force to affect the durability of the fuel cell 1, i.e., whether it is impossible to further increase the pressure in the anode 1*b*.

If the pressure in the hydrogen system is smaller than the maximum allowable hydrogen system pressure (NO in step S18), it is determined that the durability of the fuel cell 1 will not be affected by the increase in the supply pressure of the hydrogen. Therefore, the process proceeds to step S19. In step S19, the ECU 10 increases the hydrogen system target pressure. That is, the ECU 10 supplies the additional hydrogen to the anode 1*b* without opening the discharge valve 8, and increases the amount of the hydrogen supplied to the hydrogen system for the following reason. Though the impurity concentration is the predetermined concentration more, since the pressure value in the hydrogen system is smaller than the maximum allowable hydrogen system pressure. Therefore, the durability of the fuel cell 1 will not be affected by the increase in the pressure due to the supply of the hydrogen. Thus, it is possible to suppress the unnecessary gas discharge in the hydrogen system without reducing the power generation stability of the fuel cell 1. After the above step is finished, the process goes back to step S12.

If the pressure value in the hydrogen system is equal to or higher than the maximum allowable hydrogen system pressure (YES in step S18), the process proceeds to step S20. In step S20, the ECU 10 opens the discharge valve 8 to discharge the fluid (e.g., hydrogen, nitrogen, and water in the anode 1*b*). In this case, the impurity concentration is equal to or higher than the predetermined concentration, and the pressure value in the hydrogen system has reached the maximum allowable hydrogen system pressure. Therefore, it is not possible to further increase the supply pressure of the hydrogen. Thus, the ECU 10 opens the discharge valve 8 to discharge the impurities and reduce the pressure in the anode 1*b*. This operation is performed to achieve the stable power generation by discharging the impurities, and prevent further pressure from being applied to the fuel cell 1. The ECU 10 controls the discharge valve 8 based on the pressure value in the hydrogen system or the like (for example, the ECU 10 determines the valve opening period (duty ratio) or the like). After the above step is finished, the process proceeds to step S21.

In step S21, the ECU 10 resets the initial value of the nitrogen amount and the integrated value of the permeated hydrogen amount. Specifically, the ECU 10 sets the initial value of the nitrogen amount to "(present nitrogen amount)−(discharged nitrogen amount)", and sets the integrated value of the permeated hydrogen amount to "0". The "discharged nitrogen amount" is calculated by, e.g., the above-described control method of the discharge valve 8 (such as the valve opening period and the pressure at an upstream position upstream of the valve). After the above step is finished, the process goes back to step S12.

As described above, in the embodiment according to the invention, the impurity concentration is estimated based on the present state of the hydrogen system of the fuel cell 1. Therefore, the accuracy in estimating the impurity concentration is improved. Further, since the gas supply/discharge in the hydrogen system is controlled based on the estimation result, it is possible to maintain the stable power generation performed by the fuel cell 1, and suppress the unnecessary gas discharge in the hydrogen system. Further, in the embodiment of the invention, since the gas supply/discharge in the hydrogen system is controlled also based on the maximum allowable hydrogen system pressure of the fuel cell 1, it is possible to effectively suppress the unnecessary gas discharge in the hydrogen system without affecting the durability of the fuel cell 1. Thus, fuel economy of the fuel cell 1 is improved.

MODIFIED EXAMPLE

Hereinafter, a modified example of the above-described embodiment will be described.

In the above-described embodiment, the "nitrogen amount" is used for estimation of the impurity concentration or the like. However, the invention is not limited in this respect. Alternatively, the "nitrogen concentration" may be used for estimation. Further, instead of estimating the impurity concentration, the impurity amount may be estimated, and the above-described control may be implemented based on the estimated impurity amount. Further, in the above-described embodiment, the control is implemented based on the assumption that only nitrogen is considered as the impurity. Alternatively, the water vapor amount in addition to the nitrogen amount may be taken into consideration. In this case, the water vapor amount may be determined using a map of the separation ratio of a gas-liquid separator in the fuel cell system 50, and the outlet temperature of the hydrogen system, or its substitute value.

Further, in the fuel cell system 50 shown in FIG. 1, the discharged hydrogen is not used again (the hydrogen is not circulated). However, estimation of the impurity concentration may also be performed in the fuel cell system including a hydrogen circulation system (the discharged hydrogen is circulated to use the unconsumed hydrogen again).

Further, the upper limit hydrogen system pressure value used for estimation of the impurity concentration may be calculated by the following equation (2). It is preferable that the equation (2) be used when the permeated hydrogen amount is relatively small.

$$\text{Upper limit hydrogen system pressure value} = \text{target pressure value} + \left(\begin{array}{c}\text{supplied hydrogen amount} -\\ \text{consumed hydrogen amount}\end{array}\right) + \left(\begin{array}{c}\text{maximum allowable nitrogen amount} -\\ \text{nitrogen amount (initial value)}\end{array}\right) \quad \text{equation (2)}$$

Further, instead of estimating the impurity concentration based on the pressure value such as the upper limit hydrogen system pressure value, the impurity amount may be estimated based on the gas amount in the hydrogen system by the following equation (3).

$$\text{Present nitrogen amount} = \left(\begin{array}{c}\text{hydrogen system pressure value} -\\ \text{target pressure value}\end{array}\right) + \text{nitrogen amount (initial value)} - \left(\begin{array}{c}\text{supplied hydrogen amount} -\\ \text{consumed hydrogen amount} -\\ \text{integrated value of}\\ \text{permeated hydrogen amount}\end{array}\right) \quad \text{equation (3)}$$

In this case, the ECU 10 compares the "nitrogen amount" determined by the equation (3) with the "maximum allowable nitrogen amount" to control the gas supply/discharge in the hydrogen system.

Further, in the above-described embodiment, the permeated hydrogen amount is determined based on the map. Alternatively, the permeated hydrogen amount may be calculated using the "representative value". In this case, since it is not necessary to obtain various parameters for calculating the permeated hydrogen amount, the processing time becomes shorter. However, the calculation accuracy may be lowered.

Further, in the control shown in FIG. 2, even in the case where it is determined in step S17 that the pressure value in the hydrogen system is larger than the upper limit hydrogen system pressure value, i.e., that the estimated impurity concentration is higher than the predetermined concentration, when it is determined in step S18 that it is possible to further increase the hydrogen supply pressure as a result of the comparison of the pressure value in the hydrogen system with the maximum allowable hydrogen system pressure, the hydrogen supply pressure is increased without opening the discharge valve 8 in step S19. Alternatively, instead of performing steps S18 and S19, if the estimated impurity concentration is higher than the predetermined concentration, the process may always proceed to step S20 to open the discharge valve 8 for discharging the gas containing the impurities in the hydrogen system.

What is claimed is:

1. A fuel cell system, comprising:
   a pressure obtaining portion that obtains a pressure in a hydrogen system of a fuel cell;
   a pressure estimation portion that estimates a hydrogen partial pressure in the hydrogen system; and
   an impurity estimation portion that estimates an impurity concentration or an impurity amount in the hydrogen system based on the obtained pressure and the estimated hydrogen partial pressure,
   wherein the pressure estimation portion estimates an amount of hydrogen present in an anode of the hydrogen system based on an amount of hydrogen consumed by the fuel cell and an integrated value of an amount of hydrogen permeated through an electrolyte membrane of the fuel cell that is determined from a relationship between a power generation amount and a temperature of the fuel cell.

2. The fuel cell system according to claim 1, wherein the impurity estimation portion estimates that the impurity concentration or impurity amount is equal to or higher than a predetermined value if the pressure obtained by the pressure obtaining portion is equal to or higher than an upper limit hydrogen system pressure value determined based on the hydrogen partial pressure estimated by the pressure estimation portion, said upper limit hydrogen system pressure value being an upper limit value of the pressure which allows for stable power generation of the fuel cell.

3. The fuel cell system according to claim 2, wherein the pressure estimation portion estimates the upper limit hydrogen system pressure value based on at least a target pressure value determined by a power generation amount required of the fuel cell, the amount of hydrogen present in the anode of the fuel cell, and a maximum allowable nitrogen amount which is a maximum value of a nitrogen amount at which power generation can be performed stably in the anode.

4. The fuel cell system according to claim 3, wherein the pressure estimation portion calculates the maximum allowable nitrogen amount based on the power generation amount and the temperature of the fuel cell.

5. The fuel cell system according to claim 2, further comprising:
a portion that increases the hydrogen partial pressure of the hydrogen system if the impurity estimation portion determines that the impurity concentration or impurity amount is equal to or higher than the predetermined value, and the pressure obtained by the pressure obtaining portion is smaller than the predetermined pressure.

6. The fuel cell system according to claim 5, wherein the predetermined pressure is a maximum allowable hydrogen system pressure which is a maximum pressure of the hydrogen system which can be tolerated by the fuel cell.

7. The fuel cell system according to claim 2, further comprising:
a portion that discharges fluid in the hydrogen system if the impurity estimation portion estimates that the impurity concentration or impurity amount is equal to or higher than the predetermined concentration value.

8. The fuel cell system according to claim 2, further comprising:
a portion that discharges fluid in the hydrogen system if the impurity estimation portion estimates that the impurity concentration or impurity amount is equal to or higher than the predetermined value, and the pressure obtained by the pressure obtaining portion is equal to or higher than a predetermined pressure.

9. The fuel cell system according to claim 8, wherein the predetermined pressure is a maximum allowable hydrogen system pressure which is a maximum pressure of the hydrogen system which can be tolerated by the fuel cell.

10. The fuel cell system according to claim 1, wherein the pressure estimation portion further estimates the amount of hydrogen present in the anode based on an amount of hydrogen supplied to the fuel cell.

11. The fuel cell system according to claim 10, wherein the pressure estimation portion estimates the maximum allowable nitrogen amount based on the power generation amount and the temperature of the fuel cell.

12. The fuel cell system according to claim 1, wherein the impurity estimation portion estimates the impurity concentration based on the pressure obtained by the pressure obtaining portion, the pressure estimated by the pressure estimation portion, an amount of nitrogen in the hydrogen system, and a maximum allowable nitrogen amount of the fuel cell which is a maximum value of the nitrogen amount at which power generation can be performed stably in the anode.

13. The fuel cell system of claim 1, wherein as the power generation amount increases, the amount of hydrogen permeated through the electrolyte increases.

14. The fuel cell system of claim 1, wherein as the temperature of the fuel cell increases, the amount of hydrogen permeated through the electrolyte increases.

15. A fuel cell system, comprising:
pressure obtaining means for obtaining a pressure in a hydrogen system of a fuel cell;
pressure estimation means for estimating a hydrogen partial pressure in the hydrogen system; and
impurity estimation means for estimating an impurity concentration or an impurity amount in the hydrogen system based on the obtained pressure and the estimated hydrogen partial pressure,
wherein the pressure estimation means estimates an amount of hydrogen present in an anode of the hydrogen system based on an amount of hydrogen consumed by the fuel cell and an integrated value of an amount of hydrogen permeated through an electrolyte membrane of the fuel cell that is determined from a relationship between a power generation amount and a temperature of the fuel cell.

16. The fuel cell system of claim 15, wherein as the power generation amount increases, the amount of hydrogen permeated through the electrolyte increases.

17. The fuel cell system of claim 15, wherein as the temperature of the fuel cell increases, the amount of hydrogen permeated through the electrolyte increases.

* * * * *